United States Patent
Grünwedel et al.

(10) Patent No.: US 11,961,215 B2
(45) Date of Patent: Apr. 16, 2024

(54) MODULAR INPAINTING METHOD

(71) Applicant: Conti Temic microelectronic GmbH, Nuremberg (DE)

(72) Inventors: Ekaterina Grünwedel, Stahnsdorf (DE); Charlotte Gloger, Ulm (DE); Andreas Panakos, Ulm (DE)

(73) Assignee: Conti Temic microelectronic GmbH, Nüremberg (DE)

( * ) Notice: Subject to any disclaimer, the term of this patent is extended or adjusted under 35 U.S.C. 154(b) by 235 days.

(21) Appl. No.: 17/310,566

(22) PCT Filed: Jan. 30, 2020

(86) PCT No.: PCT/DE2020/200008
§ 371 (c)(1),
(2) Date: Aug. 11, 2021

(87) PCT Pub. No.: WO2020/164671
PCT Pub. Date: Aug. 20, 2020

(65) Prior Publication Data
US 2022/0156894 A1    May 19, 2022

(30) Foreign Application Priority Data
Feb. 11, 2019    (DE) ..................... 10 2019 201 702.9

(51) Int. Cl.
*G06T 5/00*    (2006.01)
*B60R 1/28*    (2022.01)
(Continued)

(52) U.S. Cl.
CPC .................. *G06T 5/77* (2024.01); *B60R 1/28* (2022.01); *G06T 5/20* (2013.01); *G06V 20/586* (2022.01);
(Continued)

(58) Field of Classification Search
CPC .......... G06T 5/005; G06T 5/20; G06V 20/64; G06V 20/586; B60R 1/28
See application file for complete search history.

(56) References Cited

U.S. PATENT DOCUMENTS

| 10,817,663 B2 | 10/2020 | Weald et al. |
| 2013/0156297 A1 | 6/2013 | Shotton |

(Continued)

FOREIGN PATENT DOCUMENTS

| CN | 103310415 A | 9/2013 |
| CN | 104185009 A | 12/2014 |

(Continued)

OTHER PUBLICATIONS

Japanese Notice of Reasons for Refusal dated Jul. 27, 2022 for the Counterpart Japanese Patent Application No. 2021-542481.

(Continued)

*Primary Examiner* — Mishawn N. Hunter

(57) ABSTRACT

A method for processing images is described, wherein a scenery is recorded as at least one raw image by at least one optical capture means mounted on a vehicle, and wherein image data of the scenery are mapped incompletely and/or erroneously in the subsequently rendered render image in at least one area. In order to provide a user of one or more cameras on a motor vehicle, that have visibility restrictions with a more agreeable visual experience, the method includes identifying the area(s) of incomplete and/or erroneous mapping in the render image on the basis of existing visibility restrictions, generating masks that enclose the area(s) of incomplete and/or erroneous mapping as masked areas, reconstructing image data in unmasked areas of the render image by means of digital inpainting and synthesiz- (Continued)

ing together with the masked areas to produce a correction image, and displaying the completed and/or debugged correction image.

14 Claims, 1 Drawing Sheet

(51) Int. Cl.
*G06T 5/20* (2006.01)
*G06T 5/77* (2024.01)
*G06V 20/58* (2022.01)
*G06V 20/64* (2022.01)

(52) U.S. Cl.
CPC .... *G06V 20/64* (2022.01); *G06T 2207/20081* (2013.01); *G06T 2207/20084* (2013.01); *G06T 2207/30264* (2013.01)

(56) References Cited

U.S. PATENT DOCUMENTS

| | | | |
|---|---|---|---|
| 2014/0347470 A1 | 11/2014 | Zhang et al. | |
| 2015/0220791 A1* | 8/2015 | Wu | G06V 20/586 |
| | | | 348/148 |
| 2015/0379422 A1 | 12/2015 | Chandler | |
| 2016/0325680 A1 | 11/2016 | Curtis et al. | |
| 2017/0120817 A1 | 5/2017 | Kuehnle et al. | |
| 2017/0177956 A1* | 6/2017 | Zhang | G06V 10/753 |
| 2017/0330076 A1 | 11/2017 | Valpola | |
| 2018/0165798 A1 | 6/2018 | Lin et al. | |
| 2018/0225808 A1 | 8/2018 | Charkaborty et al. | |
| 2019/0213744 A1 | 7/2019 | Friebe et al. | |

FOREIGN PATENT DOCUMENTS

| | | |
|---|---|---|
| CN | 104537663 A | 4/2015 |
| CN | 107111782 A | 8/2017 |
| CN | 108171663 A | 6/2018 |
| CN | 108460734 A | 8/2018 |
| CN | 109242791 A | 1/2019 |
| JP | 2005301517 A | 10/2005 |
| JP | 2006332785 A | 12/2006 |
| WO | 2016083657 A1 | 6/2016 |
| WO | 2018072793 A1 | 4/2018 |

OTHER PUBLICATIONS

German Search Report dated Sep. 9, 2019 for the counterpart German Patent Application No. 10 2019 201 702.9.
International Search Report and the Written Opinion of the International Searching Authority dated Apr. 8, 2020 for the counterpart PCT Application No. PCT/DE2020/200008.
Kohler, et al., Mask-Specific Inpainting with Deep Neural Networks, GCPR 2014, Lecture Notes in Computer Science, vol. 8753, pp. 523-534, Springer International Publ. 2014.
Chinese Office Action dated Jun. 25, 2023 for the counterpart Chinese Patent Application No. 202080009784.8 and DeepL translation of same.
Second Office Action from the State Intellectual Property Office of People's Republic of China, Dec. 27, 2023 for counterpart China patent application 202080009784.8.
Examination Report from the European Patent Office, dated Dec. 11, 2023 for counterpart European patent application 20707560.7.

* cited by examiner

MODULAR INPAINTING METHOD

CROSS REFERENCE TO RELATED APPLICATIONS

This application is a National Stage Application under 35 U.S.C. 371 of International Application No. PCT/DE2020/200008 filed on Jan. 30, 2020, which claims priority from DE 10 2019 201 702.9, filed on Feb. 11, 2019, the disclosures of which are herein incorporated by reference in their entireties.

FIELD OF INVENTION

The present invention relates to a method, wherein a scenery is recorded as at least one raw image by at least one optical capture means mounted on a means of transport, in particular, and wherein image data of the scenery are mapped incompletely and/or erroneously in the subsequently rendered render image at least in at least one area. In addition, the invention relates to an image processing system, the use of the same and a means of transport.

BACKGROUND

Means of transport, including in particular land vehicles, are being equipped with an increasing number of assistance systems. These also include camera devices which are intended to provide the occupants, including preferably the respective vehicle operator, with a visual impression of one or more sceneries outside a passenger compartment, for example in order to support, facilitate or monitor a parking maneuver.

Nowadays, most of the parking solutions are based on multiple cameras, in order to provide a better impression of the surroundings during the parking of the car. Admittedly, not all areas around the car are covered with cameras. By way of example, the area under the vehicle does not have a camera image. This creates black spots which are disagreeable to the viewer.

SUMMARY

It is therefore provided a user of optical capture systems, for example one or more cameras on a motor vehicle, that have visibility restrictions with a more agreeable visual experience by depicting areas having incomplete and/or erroneous information correctly.

The solution initially includes a modular method, in which in a first step an identification of missing parts in the rendered image takes place based on visibility restrictions. A mask or masks is/are then compiled from the missing parts of the rendered image in a next step, wherein the rendered image is only to be reconstructed in these masks. The image data are then reconstructed in the masked areas by digital inpainting, wherein there are several possible ways of carrying out the reconstruction, following which the data of the completed and/or debugged correction image are finally displayed in a display step. In this case, the user is thus provided with an improved visual experience by reconstructing missing data on the basis of existing data.

In an advantageous variant which further improves the visual experience of a user, the correction image is optimized by subsequent processing to produce an optimization image and the latter is displayed instead of the respective correction image. Possible artifacts can, for example, be smoothed out and the appearance can be fashioned in a more agreeable manner to the eye following the image reconstruction, for which reason the rendered image can be subsequently processed, for example in order to increase the sharpness, to reduce the contrast and/or to harmonize colors.

In the case of an advantageous variant of the method, in order to allow the user to react promptly to sceneries in the images shown to him, the render images, reconstructed correction images or optimized optimization images are in each case displayed to the viewer as displayable images in real time or with a negligible delay. The refresh rate of the displayable images is at least 5 fps.

In the case of a variant of the method according to the present disclosure which can be handled very well, the visibility restrictions are determined at least on the basis of a three-dimensional model of the respective vehicle and on the basis of an accommodation of the optical capture means in order to identify the area(s) of incomplete and/or erroneous mapping in the render image. Deviating sceneries can also be described in a suitable manner on the basis of known visibility restrictions. With specific reference to a scenario having a motor vehicle, those parts of the rendered scene which do not have any image data can be recognized on the basis of a 3D model of the motor vehicle and of the camera housing.

For a multiple or permanent use, data regarding visibility restrictions, geometric models of the surroundings (and patterns) and (in particular) previously generated scenery data can be stored in at least one database, in the case of an advantageous variant of the method. Thus, parts of the respective render image, which are not to be reconstructed further for the mask or masks, can then be protected or faded out in a simple manner from the outset prior to further processing.

Due to the storage of known and/or already generated image data and, if applicable, also of constantly recurring masks, the image data to be reconstructed can be generated in a variant with the assistance of a machine learning approach.

The image data can be particularly reconstructed with the assistance of an artificial neural network which accesses the at least one database and is trained on the basis of the data thereof.

In the case of an advantageous variant of the method according to the present disclosure, the incomplete and/or erroneous image data can be reconstructed on the basis of edge-based methods. A search is made for edges or object transitions in the render images. The processing with algorithms frequently does not supply any closed sequences of edges; these have to be joined on the basis of additional methods, in order to include objects.

The edge-based method can be a level-set method, in particular a fast-marching method. The former constitutes a numerical method in order to track geometric objects and the movement thereof approximately, wherein curves and surfaces can be advantageously calculated on a spatially fixed coordinate system without having to use parametrizations of the relevant objects. A special method for solving boundary value problems in a numerical way is the fast-marching method which solves boundary value problems of the eikonal equation, here the development of a closed surface as a function of the time with a specific speed.

In a further advantageous variant, the edge-based method can use a diffusion approach which is deployed to reduce dimensions or extract features and is later propagated in order to predict the information in areas of incomplete and/or erroneous mapping. In this case, a machine learning approach can be deployed in a suitable manner, for example a Markov random field (MRF) method, wherein the MRFs can be deployed in order to segment digital images or classified regions and start from an interaction or mutual influencings of elements of a field.

As already mentioned above, an image processing system which executes the above method in one of its variants, the use thereof in a parking assistance system of a means of transport which executes, e.g., a parking maneuver at limited speed, and also a means of transport itself, in particular a land vehicle equipped with such a system, also solve the problem set.

The above configurations and further developments can be combined in any way with one another, provided this is sensible. Further possible configurations, further developments and implementations of the invention also includes combinations of features of the invention, which are described above or below with respect to the exemplary embodiments, including those which are not explicitly indicated. In particular, the person skilled in the art will also add individual aspects as improvements or supplements to the respective basic form of the present invention.

BRIEF DESCRIPTION OF THE DRAWINGS

The present invention will be explained in greater detail below with reference to the example embodiments indicated in the schematic figures, wherein.

Figure 1A:
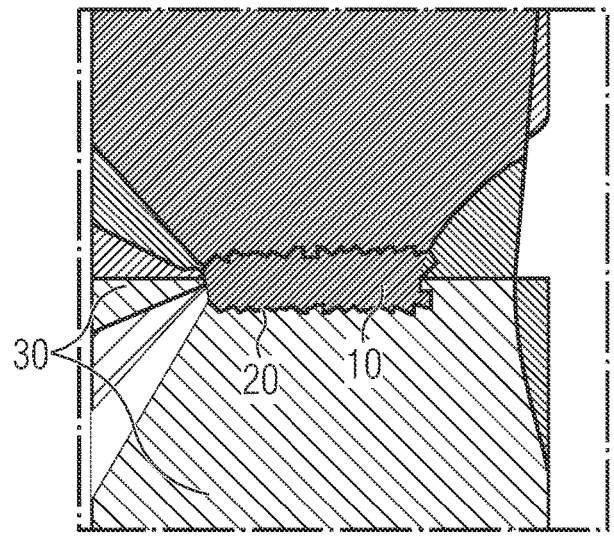
FIGS. 1a and 1b show schematic perspective views of a rear external area of a motor vehicle, captured with an optical capture means, depicted as a render image (FIG. 1a) and as a correction image (FIG. 1b) which have been generated according to the method according to the present disclosure.

The appended drawings are intended to convey a further understanding of the embodiments of the invention. They illustrate embodiments and, in connection with the description, serve to explain principles and concepts of the invention. Other embodiments and many of the indicated advantages are set out with respect to the drawings. The elements of the drawings are not necessarily shown true to scale with respect to one another.

In the figures of the drawing, elements, features and components which are similar, functionally similar and act similarly are unless otherwise indicated each equipped with the same reference numerals.

DETAILED DESCRIPTION

Figure 1B:
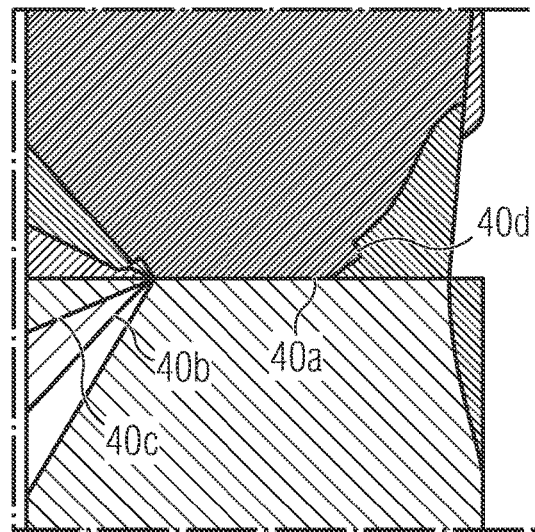

FIGS. 1a and 1b show schematic perspective views of a rear scenery in the external area of a motor vehicle, which is captured with an optical capture means. In the render image of the scenery shown in FIG. 1a, a substantially rectangular area is recognized, which is mapped incompletely, since image data of the scenery are missing due to the housing of the optical capture means which is configured as a camera and not depicted further. However, since the dimensions of the indicated housing are known and are stored in a database, the missing image data can be reconstructed by means of the method according to the invention by way of digital inpainting. The aim is to create an inherently consistent image which is guided by the entirety of the image itself and subsequently gives the user a better visual experience during viewing.

The indicated area of missing image data 10 can be recognized with a boundary 20 which separates the area from that area 30 of known image data, which constitutes an introductory, identifying step. In a next step of the method, the area 30 of known image data is equipped with a mask; masks are thus generated that enclose, with masked areas 30 which are not to be processed, the area(s) 10 of incomplete and/or erroneous mapping so that the areas 10, but not the areas 30 of image data which are known because they are correctly captured and reproduced in a rendered manner, are indeed reconstructed. In the subsequent step of the reconstruction, image data in the unmasked areas of the render image are reconstructed by means of digital inpainting and then a correction image (FIG. 1b) is synthesized together with the masked areas. Contour lines of the render image, which touch the boundary 20 of the mask, are continued along their imaginary extension into the unmasked area 10 of the image and, in addition, the structure of an area around the mask boundary 20. Various sections in the unmasked area are defined by the contour lines, which are filled with the respective color of the boundary assigned to them, following which the respective area may possibly also be textured.

To this end, it can be seen in FIGS. 1a and 1b that, for example, the edges 40a, 40b, 40c in the correction image are correctly depicted, whereas due to the darkness of the upper area, the continuation of the edge 40d shows a negligible discontinuity.

Figure 2A:
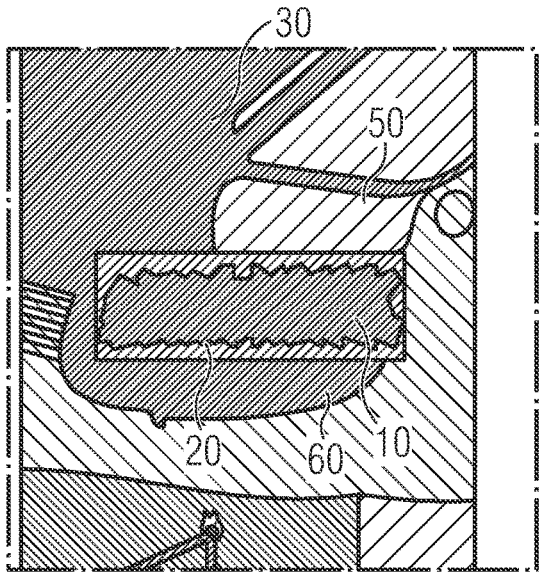
FIGS. 2a and 2b show schematic perspective views of another external area of a motor vehicle, captured with an optical capture means, depicted as a render image (FIG. 2a) and as a correction image (FIG. 2b) which have been generated according to the method according to the present disclosure.
Figure 2B:
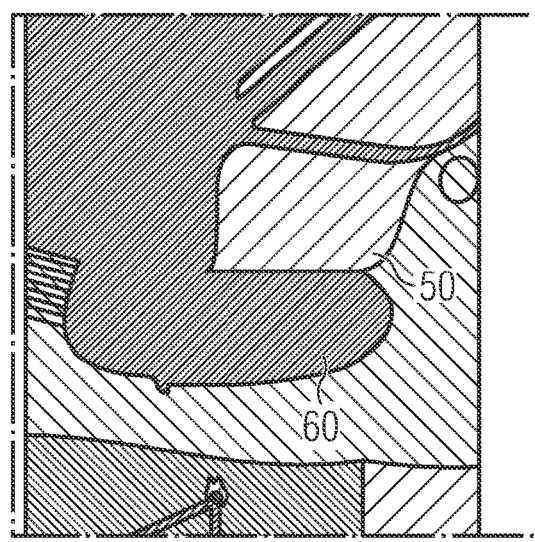

To this end, it can be further inferred from FIGS. 2a and 2b which, in turn, show a render image (FIG. 2a) and a correction image (FIG. 2b) of another, in this case lateral, scenery on a motor vehicle, viewed from above, that the missing image data of the, in turn, rectangular area 10 in the render image, on the one hand, the mapped structure 50, but also the shadow area 60 facing away from a light source (not depicted) are reproduced correctly in the correction image by the reconstruction according to the present disclosure.

Consequently, the example embodiments described above relate to a method for processing images, wherein a scenery is recorded as at least one raw image by at least one optical capture means mounted on a means of transport, in particular, and wherein image data of the scenery are mapped incompletely and/or erroneously in the subsequently rendered render image at least in at least one area. The method includes the steps:

identifying the area(s) of incomplete and/or erroneous mapping in the render image on the basis of existing visibility restrictions;
 generating masks that enclose the area(s) of incomplete and/or erroneous mapping as masked areas 30;
 reconstructing (from information) image data in unmasked areas 10 of the render image by means of digital inpainting and synthesizing together with the masked areas 30 to produce a correction image; and
 displaying the completed and/or debugged correction image.

As a result, the visual experience of a user of a system equipped with the optical capture means is improved in a suitable manner, since a spot-free, continuous representation of the scenery is provided in the correction image.

In the previous detailed description, various features for improving the stringency of the representation have been summarized in one or more examples. However, it should be clear that the above description is merely illustrative, but by no means limiting. It serves to cover all alternatives, modifications and equivalents of the various features and example embodiments. Many other examples will be immediately and directly obvious to the person skilled in the art due to his professional knowledge in view of the above description.

The example embodiments have been selected and described in order to be able to represent the underlying principles of the invention and its possible applications in practice in the best possible way. As a result, persons skilled in the art can optimally modify and utilize the invention and its various exemplary embodiments with respect to the intended purpose. In the claims and the description, the terms "containing" and "having" are used as neutral-language terminology for the corresponding expression "comprising". Furthermore, the use of the terms "one" and "a" fundamentally does not exclude a plurality of features and components described thus.

LIST OF REFERENCE NUMERALS

- 10 Unmasked area
- 20 Mask boundary
- 30 Masked area
- 40a, 40b, 40c, 40d Edges
- 50 Structure
- 60 Shadow area

The invention claimed is:

1. A method for processing images, wherein a scenery is recorded as at least one raw image by at least one optical capture means mounted on a vehicle, in particular, and wherein image data of the scenery are mapped incompletely and/or erroneously in a subsequently rendered render image in at least one area, wherein the method comprises:
identifying, by an image processor, the at least one area of incomplete and/or erroneous mapping in the render image on the basis of existing visibility restrictions;
generating, by the image processor, masks that enclose the at least one area of incomplete and/or erroneous mapping as masked areas;
reconstructing, by the image processor, image data in unmasked areas of the render image by digital inpainting and synthesizing together with the masked areas to produce a correction image; and
displaying, by a display, the correction image,
wherein the imcomplete and/or erroneous image data are reconstructed on the basis of at least one edge-based method, and
wherein the at least one edge-based method
comprises a level-set method, and/or
predicts information in the at least one area of incomplete and/or erroneous mapping using a diffusion approach.

2. The method according to claim 1, wherein the method further comprises:
visually improving, by the image processor, the correction image by subsequent processing to produce a visually improved image and displaying the visually improved image instead of the correction image.

3. The method according to claim 2, wherein the render image, the reconstructed correction image and/or the visually improved image is in each case displayed to a viewer as a displayable image in real time or with a negligible delay.

4. The method according to claim 1, wherein the visibility restrictions for identifying the at least one area of incomplete and/or erroneous mapping in the render image are determined at least on the basis of a three-dimensional model of the vehicle and on the basis of an accommodation of the optical capture means.

5. The method according to claim 1, wherein data regarding visibility restrictions, geometric models of the surroundings and previously generated scenery data are stored in at least one database.

6. The method according to claim 1, wherein the reconstructed image data are generated using machine learning.

7. The method according to claim 1, wherein the image data are reconstructed with an artificial neural network which accesses at least one database and is trained on the basis of the data thereof.

8. The method according to claim 1, wherein the at least one edge-based method is the level-set method.

9. The method according to claim 8, wherein the level-set method is a fast marching method.

10. The method according to claim 1, wherein the at least one edge-based method predicts the information in the at least one area of incomplete and/or erroneous mapping using the diffusion approach.

11. The method according to claim 1, wherein the incomplete and/or erroneous image data are reconstructed with the diffusion approach using a Markov random field method which predicts the information in the at least one area of incomplete and/or erroneous mapping.

12. An image processing system equipped with at least one optical capture means comprising at least one camera which captures at least one raw image and is provided and configured to digitally process the at least one image, and having a display for displaying a processed image, and which carries out a method according to claim 1.

13. The image processing system according to claim 12, wherein the image processing system forms part of a parking assistance system of a vehicle which executes a parking maneuver at a limited speed.

14. A vehicle equipped with the image processing system according to claim 12.

* * * * *